(12) United States Patent
Inoue et al.

(10) Patent No.: US 6,325,988 B1
(45) Date of Patent: Dec. 4, 2001

(54) PROCESS FOR PREPARING SPINEL TYPE LITHIUM MANGANESE COMPOSITE OXIDE AND CATHODE ACTIVE MATERIAL FOR RECHARGEABLE BATTERY

(75) Inventors: Hidetoshi Inoue; Kazuhiko Kikuya; Hitoshi Machimura; Yukio Matsubara, all of Toyama (JP)

(73) Assignee: Fuji Chemical Industry Co., Ltd., Toyama (JP)

( * ) Notice: Subject to any disclaimer, the term of this patent is extended or adjusted under 35 U.S.C. 154(b) by 0 days.

(21) Appl. No.: 09/403,548

(22) PCT Filed: May 6, 1998

(86) PCT No.: PCT/JP98/02011

§ 371 Date: Oct. 25, 1999

§ 102(e) Date: Oct. 25, 1999

(87) PCT Pub. No.: WO98/50308

PCT Pub. Date: Nov. 12, 1998

(30) Foreign Application Priority Data

May 7, 1997 (JP) .................................. 9-134391
Dec. 26, 1997 (JP) .................................. 9-368239

(51) Int. Cl.$^7$ .......................... C01G 45/12; C01F 7/00; C01D 15/00; C01D 1/00
(52) U.S. Cl. .......................... 423/599; 423/600; 429/224
(58) Field of Search ............................ 423/599, 600, 423/594, 596; 429/221, 223, 224

(56) References Cited

U.S. PATENT DOCUMENTS

| 5,605,773 | * | 2/1997 | Ellgen | 423/599 |
|---|---|---|---|---|
| 5,631,104 | * | 5/1997 | Zhong et al. | 423/599 |
| 5,639,438 | * | 6/1997 | Ellgen | 423/599 |
| 5,648,057 | * | 7/1997 | Ueda et al. | 423/599 |
| 5,677,087 | * | 10/1997 | Amine et al. | 423/599 |
| 6,080,510 | * | 6/2000 | Hemmer et al. | 423/599 |

FOREIGN PATENT DOCUMENTS

94/22767 * 10/1994 (WO).
96/10538 * 4/1996 (WO).

* cited by examiner

Primary Examiner—Steven Bos
(74) Attorney, Agent, or Firm—Nath & Associates PLLC; Harold L. Novick

(57) ABSTRACT

A process for preparing a spinel lithium manganese complex oxide having the general formula $Li_xMn_{2-y}Al_yO_4$ (wherein $0.9 \leq x \leq 1.1$, and $0.002 \leq y \leq 0.5$) the process comprising the steps of reacting a manganese complex hydroxide represented by the general formula (IIa) $Mn^{2+}_{(1-a)}Al^{3+}_{a}(OH)_{[2+a-nz]}(A^{n-})_z \cdot mH_2O$ (wherein $A^{n-}$ is an anion having a valence n, $0.001 \leq a \leq 0.25$, $0.03 < z < 0.3$ and $0 < m$) with a water-soluble lithium compound in a molar ratio of Li/(Mn+Al) of 0.45~0.55 in an aqueous medium to obtain a slurry, spray- or freeze-drying the obtained slurry, and heating the resultant dry material at a temperature of 600~900° C.

8 Claims, 3 Drawing Sheets

Drawing

PROCESS FOR PREPARING SPINEL TYPE LITHIUM MANGANESE COMPOSITE OXIDE AND CATHODE ACTIVE MATERIAL FOR RECHARGEABLE BATTERY

TECHNICAL FIELD

The present invention relates to a process for preparing a spinel type of lithium manganese complex oxide having an improved charging and discharging cycle characteristics at an elevated temperature (50° C. or more) and to a positive electrode active material for a lithium ion secondary battery which comprises the spinel type of lithium manganese complex oxide prepared by this process.

BACKGROUND ART

As electronic appliances have been rendered small and portable in recent years, there has been increased a demand for lithium secondary batteries having a light weight and a high energy density. Among them, a spinel type of $LiMn_2O_4$ which may be utilized as a positive electrode active material for 4 V grade of lithium ion secondary batteries has been drawn attention for the use as the battery material for general use product such as automobile and the like since the raw material for manganese is abundant in resource and inexpensive.

Although spinel type of $LiMn_2O_4$ is a material having relatively high battery capacity, it has a problem in cycle characteristics during charge and discharge, especially cycle characteristics under an elevated temperature (50° C. or more) or in the elution of Mn into an electrolyte.

In order to solve such a problem, there has been proposed substitution of a part of Mn present in the spinel $LiMn_2O_4$ structure for other metal. $MnO_6$ octahedron wherein oxygen atoms are arranged in 6 directions is structurally unstable because Mn located at the center of the structure has a large ionic radius so that clearance between oxygen atoms which are located at the outside of the octahedron becomes much. On the contrary, by substituting a part of Mn ion located at the center of the octahedron for an ion which is smaller than Mn, the structure is stabilized for the reason that the clearance between oxygen atoms becomes little so that a good packing is realized. Furthermore, it is expected that the reactivity of the other metal substituted product toward electrolyte is lowered so that the elution of Mn into the electrolyte becomes remarkably little.

As a process for preparing Mn complex oxides wherein a part of Mn is substituted for another metal, there is disclosed Al-substitution process (Japanese Laid-Open Patent Application Nos. Hei 4-289662, Hei 2-220358 etc.), B-substitution process (Japanese Laid-Open Patent Application No. Hei 8-195200), Fe- and Cr-substitution process (Japanese Laid-Open Patent Application No. Hei 9-245836) or the like. However, since each of these prior art processes is the so-called dry process wherein a water-insoluble Mn oxide or hydroxide and other metal component are mixed in a powdered form and subsequently heated, there has not yet been obtained complex oxide wherein metal to be substituted is uniformly doped with Mn. Therefore, there has not yet been obtained complex oxide which had eliminated sufficiently such fault of $LiMn_2O_4$ as in the charging and discharging cycle characteristics, especially cycle characteristics at an elevated temperature (50° C. or more) or in the elution of Mn into an electrolyte.

Also, although Mn series of secondary batteries have been drawn attention as the electric source material for use in an electric automobile or notebook type of personal computer, they are often used under an environment of relatively higher temperature than the ordinary temperature, and therefore, the improvement in the charging and discharging cycle characteristics at an elevated temperature has been desired.

DISCLOSURE OF THE INVENTION

An object of the present invention is to provide a process for preparing a spinel type of lithium manganese complex oxide which has the improved charging and discharging cycle characteristics under an environment of an elevated temperature (50° C. or more) by a means of substituting a part of Mn for the other metal and doping them uniformly as the solid solution, and further to provie a positive electrode active material for a lithium ion secondary battery which comprises the spinel type of lithium manganese complex oxide prepared by this process.

As a result of having studied ardently to achieve the above objects, the present inventors have found that the above objects may be achieved by spinel type of lithium manganese complex oxides which may be obtained by the process of the present invention and which may be represented by the general formula (I)

$$Li_xMn_{(2-y)}M_{y1}B_{y2}O_4 \qquad (I)$$

(wherein M is at least one metal selected from the group consisting of Al, Cr, Fe, Ni, Co, Ga and Mg, x is $0.9 \leq x \leq 1.1$, y represents $y=y_1+y_2$, $0.002 \leq y \leq 0.5$, $0 \leq y_1 < 0.5$, $0.002 \leq y_2 \leq 0.1$) and which may also be represented by the general formula (Ia) where $y_2$ in the above general formula (I) is 0

$$Li_xMn_{(2-y)}M_yO_4 \qquad (Ia)$$

(wherein each of M and x has the same significance as the above and y represents $0.002 \leq y \leq 0.5$), and further found that by using as the positive electrode active material for a lithium ion secondary battery these spinel lithium manganese complex oxides wherein a part of Mn is substituted for at least one metal selected from the group consisting of Al, Cr, Fe, Ni, Co, Ga and Mg to result in a uniform doped product, the charging and discharging cycle characteristics under an environment of a relatively higher temperature (50° C. or more) than the ordinary temperature may be improved. The present invention is based on these findings.

That is, the present invention is a process for preparing a spinel type of lithium manganese complex oxide which may be represented by the general formula (I)

$$Li_xMn_{(2-y)}M_{y1}B_{y2}O_4 \qquad (I)$$

(wherein M is at least one metal selected from the group consisting of Al, Cr, Fe, Ni, Co, Ga and Mg, x is $0.9 \leq x \leq 1.1$, y represents $y=y_1+y_2$, $0.002 \leq y \leq 0.5$, $0 \leq y_1 < 0.5$, $0.002 \leq y_2 \leq 0.1$) and which is characterized by the steps of:

suspending in an aqueous medium a manganese complex hydroxide which may be represented by the general formula (II)

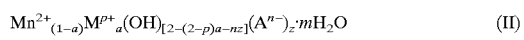
$$Mn^{2+}{}_{(1-a)}M^{p+}{}_a(OH)_{[2-(2-p)a-nz]}(A^{n-})_z \cdot mH_2O \qquad (II)$$

(wherein $M^{p+}$ is at least one metal cation having p-valence (p=2~3) selected from the group consisting of $Al^{3+}$, $Cr^{3+}$, $Fe^{3+}$, $Ni^{2+}$, $Co^{2+}$, $Ga^{3+}$ and $Mg^{2+}$, $A^{n-}$ is an anion having n-valence (n=1~2) such as $NO_3^-$, $Cl^-$, $Br^-$, $CO_3^{2-}$, $SO_4^{2-}$, $CH_3COO^-$ or the like, a, z and m represent $0 \leq a \leq 0.25$, $0.03 < z < 0.3$ and $0 < m$, respectively)

adding an aqueous solution containing boric acid ion to the suspension, adding further a water-soluble lithium compound in such an amount as to give the molar ratio of Li/(Mn+B)=0.45~0.55 [provided that the general formula (II) is limited to one where a=0] which indicates a molar ratio of lithium to the total metal content in the aqueous medium or the molar ratio of Li/(Mn+M+B)=0.45~0.55 which indicates a molar ratio of lithium to the total metal content in the aqueous medium to obtain a slurry, spray- or freeze-drying the obtained slurry, and heating the resultant residue at a temperature of 600~900° C., and a further process for preparing a spinel type of lithium manganese complex oxide which may be represented by the general formula (Ia) where $y_2$ in the above general formula (I) is 0

$$Li_xMn_{(2-y)}M_yO_4 \qquad (Ia)$$

(wherein each of M and x has the same significance, and y represents $0.002 \leq y \leq 0.5$) which is characterized by the steps of:

mixing a manganese complex hydroxide which may be represented by the general formula (IIa)

$$Mn^{2+}_{(1-a)}M^{p+}_a(OH)_{[2-(2-p)a-nz]}(A^{n-})_z \cdot mH_2O \qquad (IIa)$$

(wherein $M^{p+}$ is at least one metal cation having p-valence (p=2~3) selected from the group consisting of $Al^{3+}$, $Cr^{3+}$, $Fe^{3+}$, $Ni^{2+}$, $Co^{2+}$, $Ga^{3+}$ and $Mg^{2+}$, $A^{n-}$ is an anion having n-valence (n=1~2) such as $NO_3^-$, $Cl^-$, $Br^-$, $CO_3^-$, $SO_4^{2-}$, $CH_3COO^-$ or the like, a, z and m represent $0 \leq a \leq 0.25$, $0.03 < z < 0.3$ and $0 < m$, respectively) with a water-soluble lithium compound in a molar ratio of Li/(Mn+M)=0.45~0.55 in an aqueous medium to obtain a slurry, spray- or freeze-drying the obtained slurry, and heating the resultant residue at a temperature of 600~900° C.

The process of the present invention has two features as stated below:

The first feature is to synthesize the manganese complex hydroxide which may be represented by the general formula (II) or (IIa) wherein the metal represented by M in the above, i.e. at least one kind of metal selected from the group consisting of Al, Cr, Fe, Ni, Co, Ga and Mg is doped or bonded with manganese hydroxide in connection with the general formula (I) where $y_1 \neq 0$ or the general formula (Ia). By synthesizing such a manganese complex hydroxide, there can be conducted heating at least one kind of metal cation represented by the above M together with Mn not yet heated in uniformly doped or bonded state. Also, it is to synthesize a manganese complex hydroxide which may be represented by $Mn^{2+}(OH)_{[2-nz]}(A^{n-})_z \cdot mH_2O$ among the compounds represented by the general formula (II) in connection with the general formula (I) where $y_1=1$.

In connection with the general formula (I), the manganese complex hydroxide obtained by the above synthesis process is filtered, washed with water and suspended in water, and subsequently to the suspension is added an aqueous solution containing boric acid ion thereby there may be prepared a slurry containing B. By this preparation process, B may be mixed uniformly with the above manganese complex hydroxide being as fine as the primary particle. Furthermore, if a water-soluble lithium compound is added to the above B-containing slurry in an aqueous medium, dried and heated, then there may be easily obtained the uniformly doped spinel type of lithium manganese complex oxide which may be represented by the general formula (I).

In connection with the general formula (Ia), the manganese complex hydroxide obtained by this synthesis process is filtered, washed with water and suspended in water, and subsequently to the suspension is added a water soluble lithium compound in an aqueous medium whereby there may be easily obtained the uniformly doped spinel type of lithium manganese complex oxide which may be represented by the general formula (Ia).

The complex oxide of the present invention is one which has improved remarkably cycle characteristics, especially charging and discharging cycle characteristics under an environment of an elevated temperature (specifically 50° C. or more) which is the default of $LiMn_2O_4$, and the problems as stated above have first been solved by using it as a positive electrode active material for a lithium ion secondary battery.

The second feature is to dry the slurry prepared from the above stated manganese complex hydroxide (II) or (IIa) and the water soluble lithium compound by a spray- or freeze-drying. By application of the spray-drying which comprises drying the slurry with a nozzle or diskatomizer, drying can be instantaneously accomplished so that the manganese complex hydroxide (II) or (IIa), boric acid ion and a water-soluble lithium compound remain dispersed at the level of the respective primary particles during drying to result in the formation of a uniform composition. Also, by a high heat energe generated during drying, a very good precursor of the compound (I) or (Ia) may be obtained. By heating it, accordingly, the desired spinel and uniform doped product may be obtained without accompanying the formation of impurities such as $Mn_2O_3$ and the like, and there may be obtained uniformly doped product having improved cycle characteristics, especially charging and discharging cycle characteristics under an elevated temperature like the first feature. Even by spray-drying, a manganese complex hydroxide (II) or (IIa) and a water-soluble lithium compound remain uniformly dispersed at the level of the respective primary particles so that they may be dried in the state of highly uniform composition and hence a very good precursor of the complex oxide repesented by the general formula (I) or (Ia) may be obtained.

As a process for drying the slurry, spray- or freeze-drying process may be taken. However, the spray drying process where drying can be instantaneously accomplished to provide the spherical material in a large amount is preferred from the viewpoint of the spherical granulation nature and the uniformity of the composition.

For purpose of increasing the bulk density of the dried material according to the necessity, it may also be heated after formed by compression molding. As the dried material for compression molding, spray dried product is particularly preferred from an industrial aspect.

An atmosphere under which procedures of up to drying are performed is not limited particularly. If desired, however, they may be performed under a non-oxidative atmosphere, for example under a nitrogen atmosphere. When performed under a non-oxidative atmosphere, the formation of $Mn^{3+}$ may be suppressed thereby obtaining the desired oxide doped product may be easily obtained. Also, they may be conducted in the presence of reducing agents, for example inorganic reduing agents such as lithium borohydride, potassium borohydride, sodium borohydride and the like; and organic reduing agents such as as ascorbic acid and the like whereby there may be easily obtained the desired oxide doped product with suppressed formation of $Mn^{3+}$, as conducted under a non-oxidative atmosphere. Although the amount added of the reducing agent is not restricted particularly, usually it may be 1–10% by weight per the reaction volume.

As the water-soluble lithium compound, there may be preferably employed one containing an anion which is evaporated off during the heating. For example, lithium hydroxide, lithium nitrate, lithium oxalate or these hydrates are preferred as the water-soluble lithium compound because they have an anion capable of evaporating off during the heating. In this invention, one or more of these compounds may be optionally selected for use.

As boron, boric acid may be taken. Boric acid may be easily dissolved in water.

The manganese complex hydroxide represented by the general formula (II) or (IIa) which may be used for preparing the spinel type of complex oxide represented by the general formula (I) or (Ia) may be obtained by the following preparation process.

That is, in the cases of the general formula (II) where a≠0 and the general formula (IIa), in the cases of the general formula (II) where a≠0 and the general formula (IIa), a mixed solution comprising a water-soluble Mn and a water-soluble salt of metal represented by M wherein the atomic ratio of M/(Mn+M) becomes 0.001–0.25 in aqueous medium is prepared, and then the mixed solution and an aqueous alkaline solution are simultaneously added so as to give pH 8 or more thereby effecting the reaction. The reaction product obtained is filtered and washed with water. Otherwise, in the case of the general formula (II) where a=0, an aqueous solution of a water-suluble salt of Mn is prepared and then an alkali is added dropwisely to the aqueous solution while pH of the system is kept to 8 or more thereby effecting the reaction. The reaction product obtained is filtered and washed with water. The resultant product may be used for the subsequent reaction as it is or in the form of being suspended in water. It is particularly preferable to conduct the above-stated reaction under a non-oxidative atomosphere, for example with bubbling of nitrogen, under a vigorous stirring with maintaining the reaction temperature to 25° C. and adjusting the resident time for 30 minutes.

Examples of the alkali to be used in the present invention include alkali metal hydroxides such as sodium hydroxide, potassium hydroxide, lithium hydroxide and the like. Of them, sodium hydroxide is preferable.

$A^{n-}$ in the general formula (I) or (Ia) indicates an anion having n-valence. For example, there may be taken anions such as $NO_3^-$, $Cl^-$, $Br^-$, $CH_3COO^-$, $CO_3^{2-}$, $SO_4^{2-}$ and the like.

A wide variety of metal compounds which may be represented by M are not restricted particularly so long as they are water-soluble. For example, metal carbonate, metal nitrate, one derived from organo metal complexes and the like may be taken. Preferable ones are shown below.

As water-soluble salts of manganese there may be taken manganese sulfate, manganese nitrate, manganese chloride and the like, as water-soluble salts of Al aluminum chloride and the like, as water-soluble salts of Cr chromium nitrate 9 hydrate and the like, as water-soluble salts of Fe iron chloride, iron nitrate 9 hydrate and the like, as water-soluble salt of Ni nickel nitrate, as a water-soluble salt of Co cobalt nitrate 6 hydrate, as a water-soluble salt of Ga gailium nitrate and as a water-soluble salt of Mg magnesium chloride and the like.

The manganese complex hydroxide represented by the general formula (II) or (IIa) which may be used as the starting material in the present invention may also be prepared by the so-called seed circilation reaction method as stated below.

That is, an aqueous solution comprising a water-soluble salt of Mn and a water-soluble of M (at least one of Al, Cr, Fe, Ni, Co, Ga and Mg) or a water-soluble salt of Mn and an aqueous alkaline solution are supplied in the predetermined amount through the respective quantitative pumps to a reaction vessel equipped with a overflow to effect a reaction under a stirring at a pH of 8 or more, the overflowed slurry of the reaction product is transported to a thickener and the concentrated slurry in the thickner is contineously returned as seed to the reaction vessel. According to this preparation process, the doped manganese complex hydroxide having a bulk density of about 2 or more may be easily prepared.

The heating may be conducted under an atmosphere of an excess of oxygen in air. However, preferably it may be conducted in air which is more economical.

The temperature at which the heating is conducted may be 600~900° C., preferably 700~800° C. and more preferably 750° C. At a temperature below 600° C., there can not be obtained a product having a sufficient battery capacity while at a temperature exceeding 900° C. a product is susceptible to decomposition. Any particular control is not required for a heating atmosphere, and it is enough to conduct under an atmosphere of an air.

The heating time is not rectricted particularly. However, it may be 1 hour or more, preferably 5~20 hours, and more preferably about 10 hours. If desired, the dried materal may be heated after molded by the compression molding and the like in order to increase the bulk density of the heated material.

The thus obtained spinel type of lithium manganese complex oxide of the present invention which may be represented by. the general formula (I) or (Ia):

$$Li_xMn_{(2-y)}M_{y1}B_{y2}O_4 \quad (I)$$

$$Li_xMn_{(2-y)}M_yO_4 \quad (Ia)$$

may be effectively utilized as a positive electrode active material for a lithium ion secondary battery.

The battery test for the positive electrode active material of the present invention has been conducted by preparing a test cell and subjecting it to the test according to the method in Experimental Example as described later. The improvement in charging and discharging characteristics under an environment of an elevated temperature (50° C. or more) has been confirmed by placing the test cell in a constant-temperature oven heated to 60° C. and then subjecting it to charge and discharge.

As a negative electrode for the lithium ion secondary battery wherein the spinel type of lithium manganese complex oxide of the present invention has been used as the positive electrode active material, there may be used lithium metal, lithium alloy and a compound which is capable of occluding and releasing lithium reversibly. Examples of lithium alloy include lithium/tin alloy, lithium/aluminum alloy, lithium/lead alloy and the like. Examples of the compound which is capable of occluding and releasing lithium reversibly include carbon materials such as black carbon, graphite and the like.

An electrolyte is not restricted particularly but there may be used at least one of organic solvents, for example carbonates such as propylene carbonate, diethyl carbonate and the like; sulfolanes such as sulfolane, dimethylsulfoxide and the like; lactones such as γ-butyrolactone and the like; and ethers such as dimethoxyethane and the like.

Electrolytes are not restricted particularly but there may also be used at least one of lithium salts such as lithium perchlorate, lithium tetrafluoroborate, lithium hexafluoro phosphate, lithium trifluoromethanesulfonate, said lithium salts being dissolved in the solvents as stated above; and an inorganic or organic solid electrolyte having lithium ion conductivity.

BEST MODES FOR CARRYING OUT THE INVENTION

Figure 1:
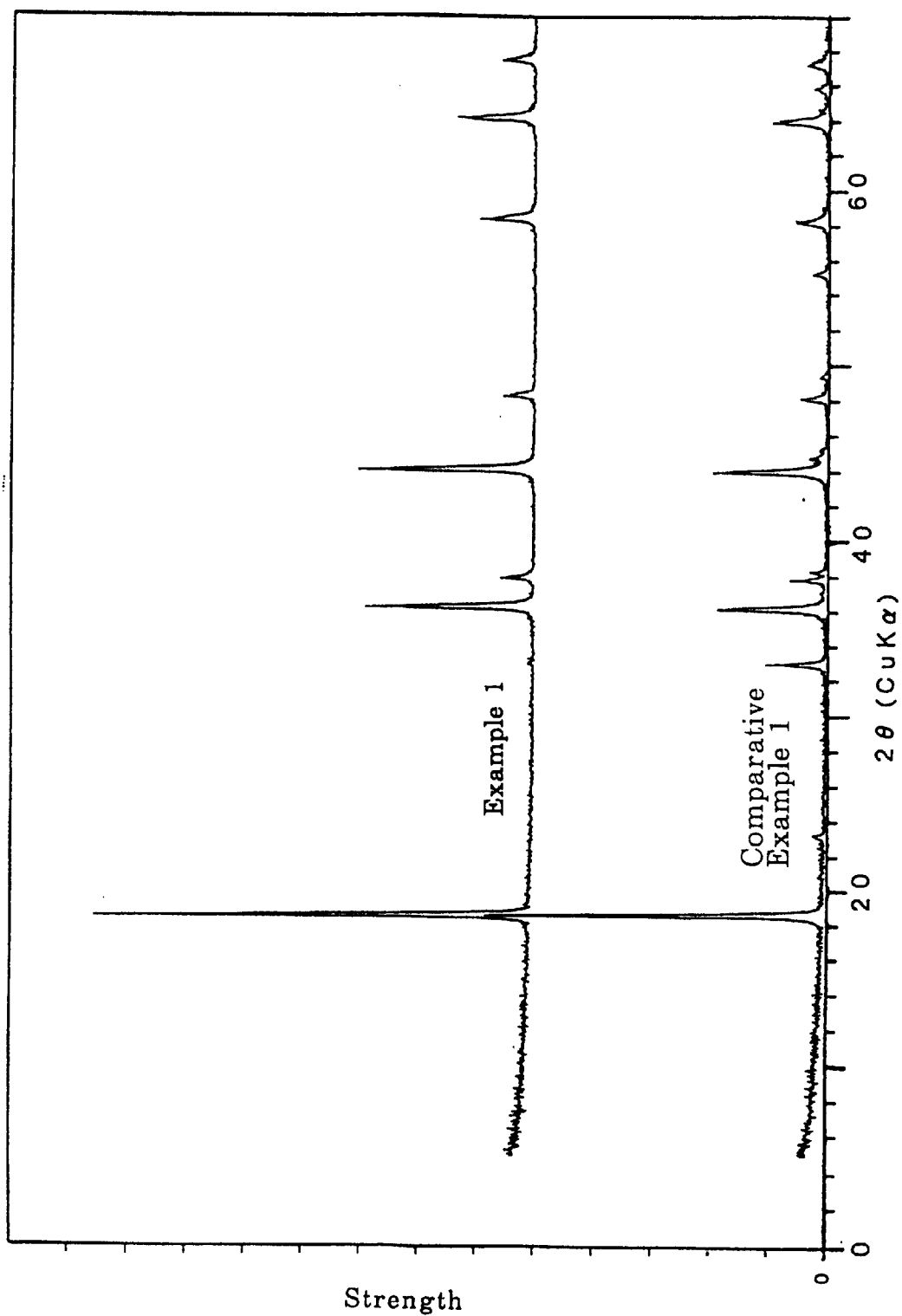
FIG. 1 is powder X-ray diffraction patterns of the lithium manganese complex oxides obtained in Example 1 and Comparative Example 1.

The present invention is more specifically illustrated by the following examples.

EXAMPLE 1

There was prepared 100 ml of a mixed aqueous solution of 2.0 mol/l manganese nitrate and aluminum nitrate wherein the atomic ratio of Al/(Mn+Al) was 0.05. This mixed aqueous solution was added to 100 ml of 4.0 mol/l aqueous sodium hydroxide solution. The reaction was conducted under a vigorous stirring while a nitrogen gas was bubbled therein and the temperature was maintained to 25° C.

The obtained reaction solution was filtered out under an atmosphere of a nitrogen gas and washed with water, and thereafter suspended in water thereby obtaining a slurry of 1 mol/l compound represented by the composition formula $Mn_{0.941}Al_{0.051}(OH)_{1.988}(NO_3)_{0.047} \cdot 0.10H_2O$ (this composition formula was identified from a portion which has been taken from the reaction product and dried at 110° C. an overnight, and similarly refers to other Examples). To the slurry 3.0 mol/l aqueous lithium hydroxide solution was added dropwisely in an amount such that the atomic ratio of Li to the (Mn+Al) content in the slurry i.e. Li/(Mn+Al) became 0.51 to effect the reaction. Thereafter, the reaction mixture was spray-dried. A series of procedures of from washing to drying was conducted in an environment where non-oxidative atmosphere (nitrogen atmosphere) was kept.

The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula of $Li_{0.997}Mn_{1.907}Al_{0.093}O_4$.

All of the X-ray peaks appearing in the X-ray diffraction pattern of the obtained powder were shown to be attributed to the spinel $LiMn_2O_4$. The lattice constant was 8.16 angstroms.

EXAMPLE 2

Ascorbic acid was added in an amount of 2% (w/v) to a mixed aqueous solution of 2.0 mol/l of manganese sulfate and aluminum sulfate wherein the atomic ratio of Al/(Mn+Al) was 0.05. In the addition to the thus prepared mixed solution, 2.5 mol/l of aqueous sodium carbonate solution was prepared. The above-mentioned 2 kinds of solutions and 4.0 mol/l aqueous sodium hydroxide solution were simultaneously added so as to maintain pH 9.0, whereupon the continuous reaction was conducted at 25° C. for 30 minutes of the resident time. The obtained reaction solution was continuously fed to a thickener, concentrated and returned to the reaction vessel at 20 times velocity as compared with the addition velocity of the raw material to carry out the so-called seed circulation reaction.

The obtained reaction solution was filtered, washed with water and suspended in water, thereby obtaining a slurry of 1 mol/l compound represented by the composition formula $Mn_{0.920}Al_{0.080}(OH)_{2.000}(CO_3)_{0.040} \cdot 0.11H_2O$. To this suspension were added dropwisely 1.0 mol/l $H_3BO_3$ aqueous solution and 3.0 mol/l aqueous lithium hydroxide solution in the respective amounts such that the atomic ratio of B to the (Mn+Al) content in the suspension i.e. B/(Mn+Al) became 0.02 and that the atomic ratio of Li/(Mn+Al+B) became 0.51 to effect the reaction. Thereafter, the reaction mixture was spray dried. The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula of $Li_{1.010}Mn_{1.800}Al_{0.016}B_{0.04}O_4$.

All of the X-ray peaks appearing in the X-ray diffraction pattern of the obtained powder were attributed to the spinel $LiMn_2O_4$. The lattice constant was 8.15 angstroms.

EXAMPLE 3

Similar procedure as in Example 2 was conducted except that no Al salt was used. That is, ascorbic acid was added to 2.0 mol/l of aqueous manganese sulfate solution in an amount of 2% (w/v) based on the volume of the aqueous solution. In addition to this aqueous solution, 2.5 mol/l of aqueous sodium carbonate solution was prepared. The above-mentioned 2 kinds of solutions and 4.0 mol/l aqueous sodium hydroxide solution were simultaneously added so as to maintain pH 9.0, whereupon the continuous reaction was conducted at 25° C. for 30 minutes of the resident time. The obtained reaction solution was continuously fed to a thickener, concentrated and returned to the reaction vessel at 20 times velocity as compared with the addition velocity of the raw material to carry out the so-called seed circulation reaction.

The obtained reaction solution was filtered, washed with water and suspended in water, thereby obtaining a slurry of 1 mol/l a compound represented by the composition formula $Mn_{1.000}(OH)_{1.954}(CO_3)_{0.023} \cdot 0.09H_2O$. To this suspension were added dropwisely 1.0 mol/l $H_3BO_3$ aqueous solution and 3.0 mol/l aqueous lithium hydroxide solution in the respective amount such that the atomic ratio of B to the Mn content in the suspension i.e. B/Mn became 0.02 and that the atomic ratio of Li/(Mn+B) became 0.51 to effect the reaction. Thereafter, the reaction mixture was spray dried. The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula the composition formula of $Li_{0.013}Mn_{1.960}B_{0.04}O_4$.

All of the X-ray peaks appearing in the X-ray diffraction pattern of the obtained powder were attributed to the spinel $LiMn_2O_4$. The lattice constant was 8.17 angstroms.

Comparative Example 1

Each of sodium hydroxide monohydrate, manganese dioxide and aluminum nitrate (special class of reagent prepared by Wako Pure Chemical Industries, Ltd. was each used) weighed so as to give the atomic ratio of Al/(Mn+Al)=0.05 and the atomic ratio of Li/(Mn+Al)=0.51 and was mixed together sufficiently in an agate mortor. Thereafter, dry gel was put in an alumina boat and heated at 900° C. for 10 hours in an atmosphere of air in a tube furnace, and the heating product was pulverized in an agate mortar to obtain powders represented by the composition formula of $Li_{1.004}Mn_{1.903}Al_{0.097}O_4$.

Some X-ray peaks attributing to the spinel $LiMn_2O_4$ were observed in the X-ray diffraction pattern of the obtained powder. The lattice constant was 8.20 angstroms.

Comparative Example 2

Each of sodium hydroxide monohydrate, manganese dioxide and boron oxide (special class of reagent prepared by Wako Pure Chemical Industries, Ltd. was each used) weighed so as to give the atomic ratio of B/(Mn+B)=0.04 and the atomic ratio of Li/(Mn+B)=0.51 and was mixed together sufficiently in an agate mortor. Thereafter, dry gel was put in an alumina boat and heated at 900° C. for 10 hours in an atmosphere of air in a tube furnace, and the heating product was pulverized in an agate mortar to obtain powders represented by the composition formula of $Li_{1.013}Mn_{1.960}B_{0.040}O_4$.

Some X-ray peaks attributing to $Li_2B_4O_7$ in addition to ones attributing to the spinel $LiMn_2O_4$ were observed in the X-ray diffraction pattern of the obtained powder. The lattice constant was 8.20 angstroms.

Experimental Example 1

The following battery test (charge and discharge test) was conducted using each of complex oxides of Example 1 and Comparative Example 1 as stated above:

For use as the positive electrode material 25 mg of $Li_xMn_{(2-y)}M_yO_4$ obtained in the above Example and Comparative Example was mixed with 16 mg of TAB -2 as a conductive agent and the mixture was subjected to compression molding on stainless steel mesh, thereby obtaining pellets each having a diammeter of 18 mm. The obtained pellets were dried at 200° C. for 2 hours or more to prepare a positive electrode material.

As a negative electrode material was used a rolled lithium metal sheet pressed-bonded to a stainless substrate. As a diaphragm, porous membrane made of polypropylene (Cell Guard 2502) and a glass filter-paper filter were used. There was used an electrolyte in which 1 mol/l $LiPF_6$ was dissolved in an ethylene carbonate/dimethyl carbonate mixture (1:2). The procedures of up to finish from setup of a test cell (semi-open type cell) were conducted in an argon replaced dry box. The charging and discharging for this test cell were performed under a voltage control between 3.5 V and 4.5 V at a constant current density of 0.4 $mA/cm^2$.

As a result of this battery test, the initial discharge capacity (mAh/g), discharge capacity at 50th cycle (mAh/g) and decrease rate of discharge capacity at 50th cycle (%) were as shown in table 1.

TABLE 1

| Sample No. | Initial Discharge Capacity (mAh/g) | Discharge Capacity at 50th Cycle (mAh/g) | Decrease Rate of Discharge Capacity at 50th Cycle (%) |
| --- | --- | --- | --- |
| Example 1 | 112.8 | 111.2 | 1.4 |
|  | 114.5 | 113.6 | 0.6 |
|  | 113.5 | 112.4 | 1.0 |

TABLE 1-continued

| Sample No. | Initial Discharge Capacity (mAh/g) | Discharge Capacity at 50th Cycle (mAh/g) | Decrease Rate of Discharge Capacity at 50th Cycle (%) |
| --- | --- | --- | --- |
| Comparative Example 1 | 90.6 | 63.8 | 29.8 |
|  | 74.5 | 68.2 | 8.5 |
|  | 83.7 | 72.5 | 13.4 |

Comparative Example 3

1.0 Mol/l aqueous manganese nitrate solution was prepared and then this aqueous solution and 1.0 mol/l aqueous sodium hydroxide solution were added simultaneously so as to maintain pH 9.0, whereupon the continuous reaction was conducted. The reaction was conducted under a vigorous stirring with bubbling a nitrogen gas while the temperature and the the resident time were maintained to 25° C. and 30 minutes, respectively. The obtained reaction solution was filtered, washed with water, and suspended in water thereby obtaining a slurry of 1 mol/l a compound represented by the composition formula $Mn_{1.000}(OH)_{1.949}(NO_3)_{0.051} \cdot 0.10H_2O$.

To the suspension 3.0 mol/l aqueous lithium hydroxide solution was added dropwisely in an amount such that the atomic ratio of Li/Mn became 0.51 with respect to the Mn content in the suspension to effect the reaction. Thereafter, the reaction mixture was spray-dried.

The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula of $Li_{1.062}Mn_{1.954}O_4$.

Figure 2:
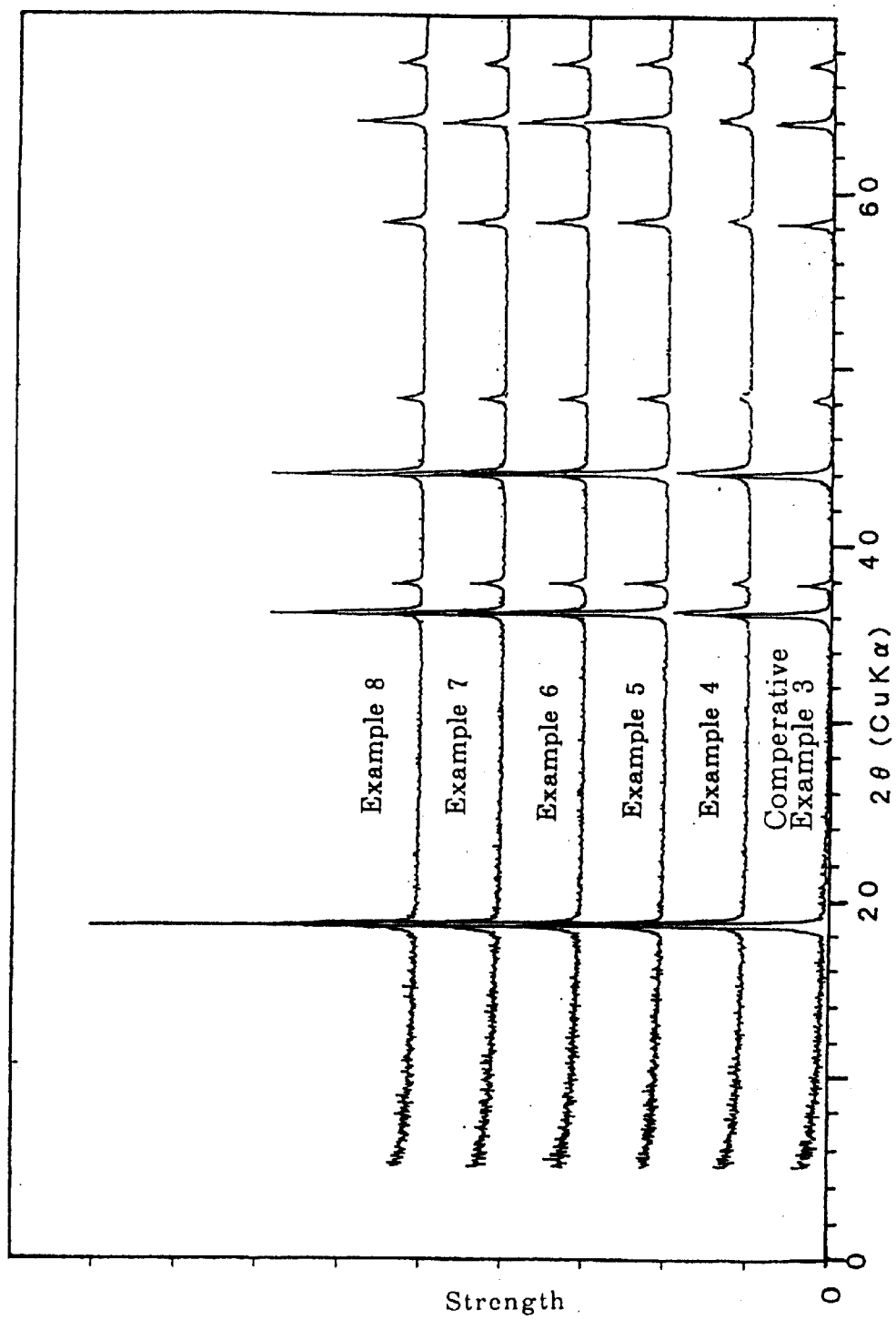
FIG. 2 is powder X-ray diffraction patterns of the lithium manganese complex oxides obtained in Examples 5~8 and Comparative Example 3.

The X-ray diffraction pattern of this powder was shown in FIG. 2. All of the X-ray peaks were attributed to the spinel $LiMn_2O_4$. The lattice constant was 8.23 angstroms.

EXAMPLE 4

There was prepared a mixed aqueous solution of 1.0 mol/l manganese nitrate and aluminum nitrate wherein the atomic ratio of Al/(Mn+Al) was 0.05. This mixed aqueous solution and 1.0 mol/l aqueous sodium hydroxide solution were added simultaneously so as to give pH 11.0, whereupon the continuous reaction was conducted. The reaction was conducted under a vigorous stirring and bubbling of a nitrogen gas while the temperature and the resident time were maintained to 25° C. and 30 minutes, respectively. The obtained reaction solution was filtered, washed with water, and thereafter suspended in water thereby obtaining a slurry of 1 mol/l a compound represented by the composition formula $Mn_{0.951}Al_{0.049}(OH)_{1.998}(NO_3)_{0.051} \cdot 0.12H_2O$.

3.0 Mol/l aqueous lithium hydroxide solution was added dropwisely to this suspension in an amount such that the atomic ratio of Li/(Mn+Al) became 0.51 with respect to the (Mn+Al) content in the suspension to effect the reaction. Thereafter, the reaction mixture was spray-dried.

The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula of $Li_{1.997}Mn_{1.907}Al_{0.099}O_4$.

The X-ray diffraction pattern of this powder was shown in FIG. 2. All of the X-ray peaks were attributed to the spinel $LiMn_2O_4$. The lattice constant was 8.21 angstroms.

EXAMPLE 5

There was prepared a mixed aqueous solution of 1.0 mol/l manganese nitrate and aluminum nitrate wherein the atomic ratio of Al/(Mn+Al) was 0.05. This mixed aqueous solution and 1.0 mol/l aqueous sodium hydroxide solution were added simultaneously so as to keep pH 11.0, whereupon the continuous reaction was conducted. The reaction was conducted under a vigorous stirring and bubbling of a nitrogen gas while the reaction temperature and the resident time were maintained to 25° C. and 30 minutes, respectively. The obtained reaction solution was filtered, washed with water, and thereafter suspended in water thereby obtaining a slurry of 1 mol/l a compound represented by the composition formula $Mn_{0.950}Al_{0.050}(OH)_{1.994}(NO_3)_{0.056} \cdot 0.10H_2O$. To this suspension were added dropwisely 1.0 mol/l $H_3BO_3$ aqueous solution and 3.0 mol/l aqueous lithium hydroxide solution in the respective amount such that the atomic ratio of B/(Mn+Al) became 0.02 with respect to the (Mn+Al) content in the suspension and that the atomic ratio of Li/(Mn+Al+B) became 0.51 to effect the reaction. Thereafter, the reaction mixture was spray-dried.

The obtained dry gel was pulverized in an agate mortar to obtain powders represented by the composition formula of $Li_{1.013}Mn_{1.866}Al_{0.100}B_{0.040}O_4$.

The X-ray diffraction pattern of this powder was shown in FIG. 2. All of the X-ray peaks were attributed to the spinel $LiMn_2O_4$. The lattice constant was 8.21 angstroms.

EXAMPLE 6

There was prepared a mixed aqueous solution of 1.0 mol/l manganese nitrate and chromium (III) nitrate wherein the atomic ratio of Cr/(Mn+Cr) was 0.03. The mixed aqueous solution was treated according to the similar manner as in Example 4 to obtain a slurry of 1 mol/l a compound represented by the composition formula $Mn_{0.970}Cr_{0.030}(OH)_{1.991}(NO_3)_{0.039} \cdot 0.12H_2O$.

3.0 Mol/l aqueous lithium hydroxide solution was added dropwisely to this suspension in an amount such that the atomic ratio of Li/(Mn+Cr) became 0.51 with respect to the (Mn+Cr) content in the suspension to effect the reaction. Thereafter, the reaction mixture was spray-dried.

The obtained dry gel was put in an alumina boat and heated at 750° C. for 10 hours in an atmosphere of air in a tube furnace, and the heating product was pulverized in an agate mortar to obtain powders represented by the composition formula of $Li_{1.050}Mn_{1.924}Cr_{0.060}O_4$.

The X-ray diffraction pattern of this powder was shown in FIG. 2. All of the X-ray peaks were attributed to the spinel $LiMn_2O_4$. The lattice constant was 8.23 angstroms.

EXAMPLE 7

There was prepared a mixed aqueous solution of 1.0 mol/l manganese nitrate and iron (III) nitrate wherein the atomic ratio of Fe/(Mn+Fe) was 0.03. The mixed aqueous solution was treated according to the similar manner as in Example 4 to obtain a slurry of 1 mol/l a compound represented by the composition formula $Mn_{0.970}Fe_{0.030}(OH)_{1.995}(NO_3)_{0.035} \cdot 0.10H_2O$.

3.0 Mol/l aqueous lithium hydroxide solution was added dropwisely to this suspension in an amount such that the atomic ratio of Li/(Mn+Fe) became 0.51 with respect to the (Mn+Fe) content in the suspension to effect the reaction. Thereafter, the reaction mixture was spray-dried.

The obtained dry gel was put in an alumina boat and heated at 750° C. for 10 hours in an atmosphere of air in a tube furnace, and the heating product was pulverized in an agate mortar to obtain powders represented by the composition formula of $Li_{1.054}Mn_{1.876}Fe_{0.059}O_4$.

The X-ray diffraction pattern of this powder was shown in FIG. 2. All of the X-ray peaks were attributed to the spinel $LiMn_2O_4$. The lattice constant was 8.23 angstroms.

EXAMPLE 8

There was prepared a mixed aqueous solution of 1.0 mol/l manganese nitrate and nickel nitrate wherein the atomic ratio of Ni/(Mn+Ni) was 0.03. The mixed aqueous solution was treated according to the similar manner as in Example 4 to obtain a slurry of 1 mol/l a compound represented by the composition formula $Mn_{0.971}Ni_{0.029}(OH)_{1.978}(NO_3)_{0.022} \cdot 0.12H_2O$.

3.0 Mol/l aqueous lithium hydroxide solution was added dropwisely to this suspension in an amount such that the atomic ratio of Li/(Mn+Ni) became 0.51 with respect to the (Mn+Ni) content in the suspension to effect the reaction. Thereafter, the reaction mixture was spray-dried.

The obtained dry gel was put in an alumina boat and heated at 750° C. for 10 hours in an atmosphere of air in a tube furnace, and the heating product was pulverized in an agate mortar to obtain powders represented by the composition formula of $Li_{1.033}Mn_{1.904}Ni_{0.059}O_4$.

The X-ray diffraction pattern of this powder was shown in FIG. 2. All of the X-ray peaks were attributed to the spinel $LiMn_2O_4$. The lattice constant was 8.23 angstroms.

EXAMPLE 9

There was prepared a mixed aqueous solution of 1.0 mol/l manganese nitrate and cobalt nitrate wherein the atomic ratio of Co/(Mn+Co) was 0.03. The mixed aqueous solution was treated according to the similar manner as in Example 4 to obtain a slurry of 1 mol/l a compound represented by the composition formula $Mn_{0.970}Co_{0.030}(OH)_{1.967}(NO_3)_{0.033} \cdot 0.11H_2O$.

3.0 Mol/l aqueous lithium hydroxide solution was added dropwisely to this suspension in an amount such that the atomic ratio of Li/(Mn+Co) became 0.51 with respect to the (Mn+Co) content in the suspension to effect the reaction. Thereafter, the reaction mixture was spray-dried.

The obtained dry gel was put in an alumina boat and heated at 750° C. for 10 hours in an atmosphere of air in a tube furnace (TF-630 type, a product of Yamada Electric Company), and the heating product was pulverized in an agate mortar to obtain powders represented by the composition formula of $Li_{1.022}Mn_{1.911}Co_{0.060}O_4$.

Figure 3:
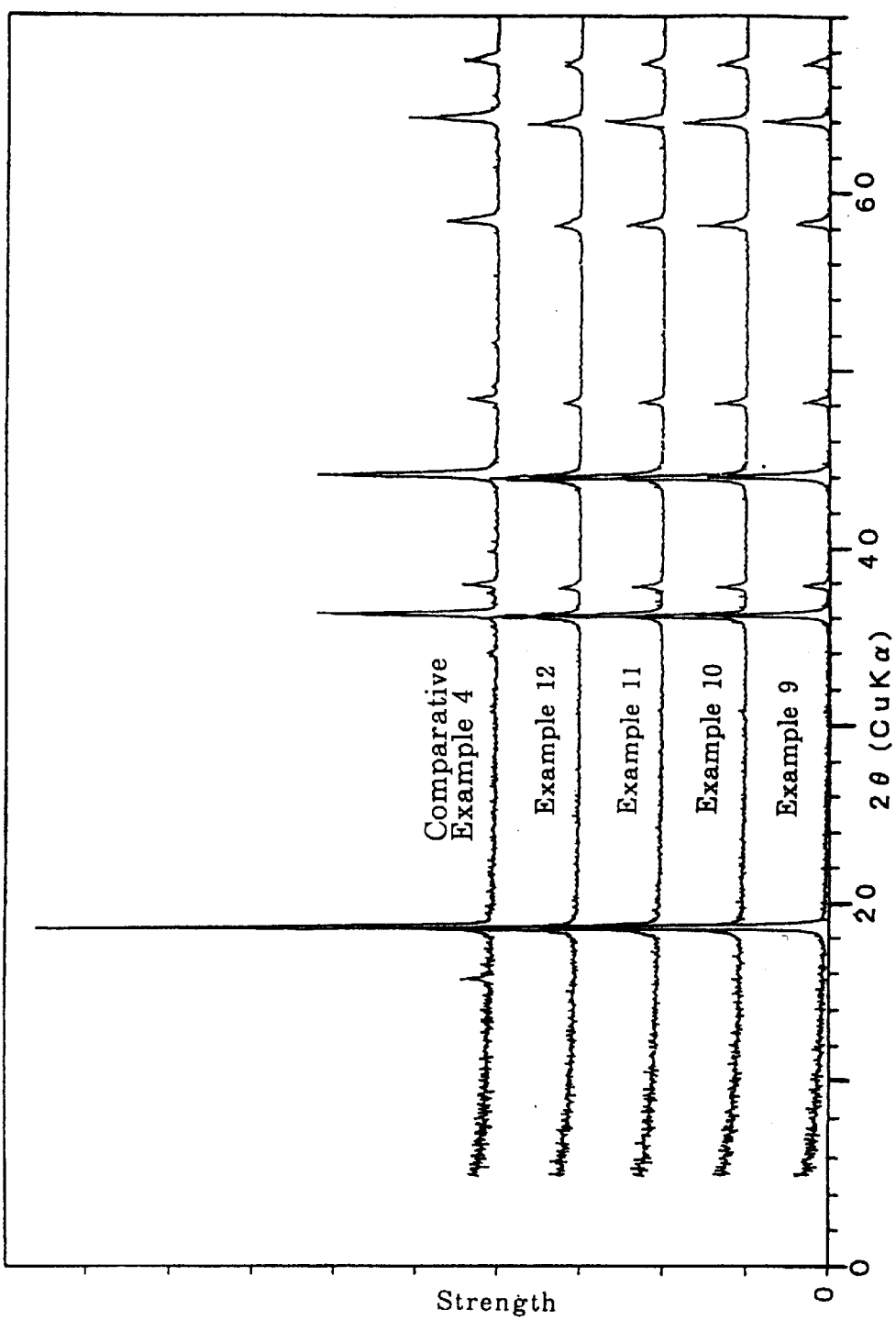
FIG. 3 is powder X-ray diffraction patterns of the lithium manganese complex oxides obtained in Examples 9~12 and Comparative Example 4.

The X-ray diffraction pattern of this powder was shown in FIG. 3. All of the X-ray peaks were attributed to the spinel $LiMn_2O_4$. The lattice constant was 8.23 angstroms.

EXAMPLE 10

There was prepared a mixed aqueous solution of 1.0 mol/l manganese nitrate and gallium nitrate wherein the atomic ratio of Ga/(Mn+Ga) was 0.03. The mixed aqueous solution was treated according to the similar manner as in Example 4 to obtain a slurry of 1 mol/l a compound represented by the composition formula $Mn_{0.969}Ga_{0.031}(OH)_{1.992}(NO_3)_{0.039} \cdot 0.10H_2O$.

3.0 Mol/l aqueous lithium hydroxide solution was added dropwisely to this suspension in an amount such that the atomic ratio of Li/(Mn+Ga) became 0.51 with respect to the (Mn+Ga) content in the suspension to effect the reaction. Thereafter, the reaction mixture was spray-dried.

The obtained dry gel was put in an alumina boat and heated at 750° C. for 10 hours in an atmosphere of air in a tube furnace, and the heating product was pulverized in an agate mortar to obtain powders represented by the composition formula of $Li_{1.051}Mn_{1.896}Ga_{0.060}O_4$.

The X-ray diffraction pattern of this powder was shown in FIG. 3. All of the X-ray peaks were attributed to the spinel $LiMn_2O_4$. The lattice constant was 8.23 angstroms.

EXAMPLE 11

There was prepared a mixed aqueous solution of 1.0 mol/l manganese nitrate and magnesium nitrate wherein the atomic ratio of Mg/(Mn+Mg) was 0.03. The mixed aqueous solution was treated according to the similar manner as in Example 4 to obtain a slurry of 1 mol/l a compound represented by the composition formula $Mn_{0.971}Mg_{0.029}(OH)_{1.971}(NO_3)_{0.029} \cdot 0.12H_2O$.

3.0 Mol/l aqueous lithium hydroxide solution was added dropwisely to this suspension in an amount such that the atomic ratio of Li/(Mn+Mg) became 0.51 with respect to the (Mn+Mg) content in the suspension to effect the reaction. Thereafter, the reaction mixture was spray-dried.

The obtained dry gel was put in an alumina boat and heated at 750° C. for 10 hours in an atmosphere of air in a tube furnace, and the heating product was pulverized in an agate mortar to obtain powders represented by the composition formula of $Li_{1.020}Mn_{1.928}Mg_{0.059}O_4$.

The X-ray diffraction pattern of this powder was shown in FIG. 3. All of the X-ray peaks were attributed to the spinel $LiMn_2O_4$. The lattice constant was 8.23 angstroms.

EXAMPLE 12

There were prepared a mixed aqueous solution of 2.0 mol/l of manganese sulfate and aluminum sulfate wherein the atomic ratio of Al/(Mn+Al) was 0.05 and 2.5 mol/l of aqueous sodium carbonate solution. The above-mentioned 2 kinds of solutions and 4.0 mol/l aqueous sodium hydroxide solution were simultaneously added so as to maintain pH 9.0, whereupon the continuous reaction was conducted at 25° C. for 30 minutes of the resident time. The obtained reaction solution was continuously fed to a thickener, concentrated and returned to the reaction vessel at 20 times velocity as compared with the addition velocity of the raw material to carry out the so-called seed circulation reaction.

The obtained reaction solution was filtered, washed with water and suspended in water, thereby obtaining a slurry of 1 mol/l a compound represented by the composition formula $Mn_{0.949}Al_{0.051}(OH)_{1.967}(CO_3)_{0.042} \cdot 0.11H_2O$.

To this suspension was added dropwisely 3.0 mol/l aqueous lithium hydroxide solution in an amount such that the atomic ratio of Li/(Mn+Al) became 0.51 with respect to the (Mn+Al) content in the suspension to effect the reaction. Thereafter, the reaction mixture was spray dried. The obtained dry gel was put in an alumina boat and heated at 750° C. for 10 hours in an atmosphere of air in a tube furnace, and the heating product was pulverized in an agate mortar to obtain powders represented by the composition formula of $Li_{1.013}Mn_{1.894}Al_{0.100}O_4$.

All of the X-ray peaks appearing in the X-ray diffraction pattern of the obtained powder were attributed to the spinel $LiMn_2O_4$. The lattice constant was 8.22 angstroms.

Comparative Example 4

Potassium hydroxide monohydrate, manganese dioxide and aluminum nitrate weighed and were mixed sufficiently in an agate mortor so as to give the atomic ratio of Al/(Mn+Al)=0.05 and the atomic ratio of Li/(Mn+Al)=0.51. Thereafter, dry gel was put in an alumina boat and heated at 900° C. for 10 hours in an atmosphere of air in a tube furnace, and the heating product was pulverized in an agate mortar to obtain powders represented by the composition formula of $Li_{1.004}Mn_{1.902}Al_{0.097}O_4$.

There were observed X-ray peaks attributing to $Li_2MnO_3$ and $Mn_2O_3$ as well as those attributing to the spinel $LiMn_2O_4$ in the X-ray diffraction pattern of the obtained powder.

The lattice constant was 8.21 angstroms.

Experimental Example 2

The following battery test (charge and discharge test) was conducted using the respective complex oxides of the above-stated Examples 5~12 and Comparative Example 4:

A test cell and an electrolyte for battery test was prepared by the similar manner as in Experimental Example 1.

The test cell was placed in a thermostatic oven of 60° C. and allowed to stand for 30 minutes in a open-circuit state. Thereafter, the constant-current and -voltage charging and discharging were performed under a voltage between 3.5 V and 4.5 V at a constant current density of 0.4 mA/cm².

As a result of this battery test, the initial discharge capacity (mAh/g), discharge capacity at 50th cycle (mAh/g) and decrease rate of discharge capacity at 50th cycle (%) were as shown in table 2.

TABLE 2

| Sample No. | Initial Discharge Capacity (mAh/g) | Discharge Capacity at 50th Cycle (mAh/g) | Decrease Discharge at 50th Cycle (%) | Rate of Bulk Capacity Density (g/ml) |
|---|---|---|---|---|
| Comparative Example 3 | 131.8 | 95.6 | 27.19 | 1.51 |
| Example 4 | 106.5 | 100.9 | 5.26 | 1.39 |
| Example 5 | 103.6 | 96.5 | 6.85 | 1.37 |
| Example 6 | 120.7 | 111.7 | 7.45 | 1.64 |
| Example 7 | 100.9 | 75.3 | 25.37 | 1.41 |
| Example 8 | 103.9 | 102.2 | 1.64 | 1.55 |
| Example 9 | 123.7 | 99.2 | 19.81 | 1.62 |
| Example 10 | 122.2 | 104.1 | 14.81 | 1.49 |
| Example 11 | 117.5 | 101.9 | 13.28 | 1.43 |
| Example 12 | 100.3 | 93.2 | 7.08 | 2.02 |
| Comparative Example 4 | 98.3 | 68.5 | 30.32 | 1.42 |

Industrial Applicability

According to the present invention there can be provided a novel process for preparing a spinel type of lithium manganese complex oxide having an improved charging and discharging cycle characteristics under an environment of the elevated temperature (50° C. or higher) which may be represented by the general formula (I)

$$Li_xMn_{(2-y)}M_{y1}B_{y2}O_4 \qquad (I)$$

(wherein M represents at least one selected from the group consisting of Al, Cr, Fe, Ni, Co, Ga and Mg, x represents $0.9 \leq x \leq 1.1$, y represents $y=y_1+y_2$, $0.002 \leq y \leq 0.5$, $0 \leq y_1 < 0.5$, $0.002 \leq y_2 \leq 0.1$) and which may also be represented by the general formula (Ia) where $y_2$ in the above general formula (I) is 0

$$Li_xMn_{(2-y)}M_yO_4 \qquad (Ia)$$

(wherein M and x have the same significance as the above and y represents $0.002 \leq y \leq 0.5$) and a positive electrode active material for a lithium ion secondary battery which comprises the complex oxide prepared by said process.

The complex oxide prepared by the present invention is industrially very useful since it has an improved cycle characteristics that has not been achieved, especially an improved charging and discharging cycle characteristics at higher temperature (about 50° C. or more) than room temperature.

What is claimed is:

1. A process for preparing a spinel lithium manganese complex oxide represented by the general formula (Ia)

$$Li_xMn_{2-y}Al_yO_4 \quad (Ia)$$

(wherein 0.9<x<1.1, and 0.002<y<0.5), said process comprising the steps of:

reacting a manganese complex hydroxide represented by the general formula (IIa)

$$Mn^{2+}{}_{(1-a)}Al^{3+}{}_a(OH)_{[2+a-nz]}(A^{n-})_z \cdot mH_2O \quad (IIa)$$

(wherein $A^{n-}$ is an anion having a valence n, $0.001 \leq a \leq 0.25$, $0.03<z<0.3$ and $0<m$) with a water-soluble lithium compound in a molar ratio of Li/(Mn+Al) of 0.45~0.55 in an aqueous medium to obtain a slurry, spray- or freeze-drying the obtained slurry, and heating the resultant dry material at a temperature of 600~900° C.

2. A process for preparing a spinel lithium manganese complex oxide as claimed in claim 1 wherein said manganese complex hydroxide represented by the general formula (IIa) is one obtained by a process which comprises preparing a mixed aqueous solution comprising a water-soluble salt of Mn and a water-soluble salt of Al wherein an atomic ratio of Al/(Mn+Al) is in the range of 0.001~0.25 in an aqueous medium, adding the mixed aqueous solution simultaneously with an aqueous alkaline solution to a reaction vessel so as to give a pH of 8 or more to effect the reaction, filtering and washing the obtained reaction product with water.

3. A process for preparing a spinel lithium manganese complex oxide as claimed in claim 1 wherein said manganese complex hydroxide represented by the general formula (IIa) is one obtained by a process which comprises preparing a mixed aqueous solution comprising a water-soluble salt of Mn and a water-soluble salt of Al wherein an atomic ratio of Al/(Mn+Al) is in the range of 0.001~0.25 in an aqueous medium, and adding an aqueous alkaline solution to the mixed aqueous solution under a stirring to effect a reaction while a pH of the reaction is kept to 8 or more.

4. A process for preparing a spinel lithium manganese complex oxide as claimed in claim 3 wherein a reaction to form the manganese complex hydroxide represented by the general formula (IIa) is conducted in a non-oxidative manner.

5. A process for preparing a spinel lithium manganese complex oxide as claimed in claim 3 wherein a reaction to form the manganese complex hydroxide represented by the general formula (IIa) is conducted in the presence of a reducing agent.

6. A process for preparing a spinel lithium manganese complex oxide as claimed in claim 2 wherein a preparation of the manganese complex hydroxide represented by the general formula (IIa) has been accomplished by a process wherein a mixed aqueous solution comprising a water-soluble salt of Mn and a water-soluble salt of Al, and an alkaline aqueous solution are supplied through the respective quantitative pumps to a reaction vessel equipped with an overflow to effect a reaction under a stirring at a pH of 8 or more, the overflowed slurry of the reaction product is transported to a thickener and the slurry concentrated by the thickener is continuously returned as seed to the reaction vessel.

7. A positive electrode active material for a lithium ion secondary battery which comprises the spinel type of lithium manganese complex oxide prepared by the process as claimed in claim 1.

8. A positive electrode active material for a lithium ion secondary battery as claimed in claim 7 wherein said positive electrode active material has an improved charging and discharging characteristic property under an elevated temperature.

* * * * *